United States Patent
Okamoto et al.

(10) Patent No.: US 11,518,107 B2
(45) Date of Patent: Dec. 6, 2022

(54) THREE-DIMENSIONAL SHAPED OBJECT MANUFACTURING DEVICE

(71) Applicant: SEIKO EPSON CORPORATION, Tokyo (JP)

(72) Inventors: Eiji Okamoto, Matsumoto (JP); Akihiko Tsunoya, Okaya (JP)

(73) Assignee: Seiko Epson Corporation, Tokyo (JP)

( * ) Notice: Subject to any disclaimer, the term of this patent is extended or adjusted under 35 U.S.C. 154(b) by 322 days.

(21) Appl. No.: 16/918,640

(22) Filed: Jul. 1, 2020

(65) Prior Publication Data

US 2021/0001558 A1 Jan. 7, 2021

(30) Foreign Application Priority Data

Jul. 4, 2019 (JP) .............................. JP2019-125335

(51) Int. Cl.
| | |
|---|---|
| *B29C 64/393* | (2017.01) |
| *B33Y 30/00* | (2015.01) |
| *B29C 64/218* | (2017.01) |
| *B29C 64/236* | (2017.01) |
| *B33Y 50/02* | (2015.01) |

(52) U.S. Cl.
CPC .......... *B29C 64/393* (2017.08); *B29C 64/218* (2017.08); *B29C 64/236* (2017.08); *B33Y 30/00* (2014.12); *B33Y 50/02* (2014.12)

(58) Field of Classification Search
CPC .... B29C 64/218; B29C 64/214; B29C 64/165
See application file for complete search history.

(56) References Cited

U.S. PATENT DOCUMENTS

| | | | |
|---|---|---|---|
| 2005/0001356 A1 | 1/2005 | Tochimoto et al. | |
| 2015/0273762 A1 | 10/2015 | Okamoto | |
| 2016/0318251 A1* | 11/2016 | Ederer | B29C 64/165 |
| 2017/0072644 A1* | 3/2017 | Ng | B29C 64/165 |
| 2017/0157841 A1* | 6/2017 | Green | B29C 64/141 |
| 2017/0189963 A1* | 7/2017 | Buller | B33Y 40/00 |
| 2019/0061237 A1* | 2/2019 | Kimblad | B22F 10/50 |
| 2019/0240909 A1* | 8/2019 | Hakkaku | B33Y 40/00 |
| 2020/0101663 A1* | 4/2020 | Prakash | B22F 12/00 |
| 2020/0346404 A1* | 11/2020 | Ewald | B29C 64/218 |
| 2021/0245439 A1* | 8/2021 | Mansell | B29C 64/165 |

FOREIGN PATENT DOCUMENTS

| | | |
|---|---|---|
| JP | 2001-150556 A | 6/2001 |
| JP | 2015-182428 A | 10/2015 |
| JP | 2016-016553 A | 2/2016 |

\* cited by examiner

*Primary Examiner* — Yung-Sheng M Tsui
(74) *Attorney, Agent, or Firm* — Workman Nydegger

(57) ABSTRACT

In a three-dimensional shaped object manufacturing device, when a unit is moved in a forward direction, powder is supplied from a first supply portion, a powder layer is formed by a first layer forming portion, a liquid is discharged to a shaping region from a head, and a second layer forming portion is moved in a direction separating from a shaping table before the second layer forming portion faces the shaping region, and when the unit is moved in a backward direction, the powder is supplied from a second supply portion, the powder layer is formed by the second layer forming portion, the liquid is discharged to the shaping region P from the head, and a first layer forming portion is moved in a direction separating from the shaping table before the first layer forming portion faces the shaping region.

6 Claims, 6 Drawing Sheets

THREE-DIMENSIONAL SHAPED OBJECT MANUFACTURING DEVICE

The present application is based on, and claims priority from JP Application Serial Number 2019-125335, filed Jul. 4, 2019, the disclosure of which is hereby incorporated by reference herein in its entirety.

BACKGROUND

1. Technical Field

The present disclosure relates to a three-dimensional shaped object manufacturing device.

2. Related Art

In the related art, various types of three-dimensional shaped object manufacturing devices are used. Among the devices, there is a three-dimensional shaped object manufacturing device in which a powder layer is formed and a liquid containing a binder is discharged from a head to a shaping region of a three-dimensional shaped object on the powder layer to manufacture the three-dimensional shaped object. For example, JP-A-2001-150556 discloses a three-dimensional shaping device in which a layer is formed of a powder material and a binder is discharged from a discharge nozzle of a nozzle head to the layer to manufacture a three-dimensional shaped object.

In the three-dimensional shaping device described in JP-A-2001-150556, since a powder supply portion configured to supply powder and the nozzle head are each independently configured, a size of the device tends to enlarge, and it is difficult to manufacture the three-dimensional shaped object at a high speed. In addition, there is a risk that a structural member of the device, such as a blade, during manufacture of the three-dimensional shaped object, comes into contact with a structure of the three-dimensional shaped object during the manufacturing, and the structure may be damaged.

SUMMARY

A three-dimensional shaped object manufacturing device according to the present disclosure includes: a shaping table; a unit configured to reciprocate with respect to the shaping table and including a first supply portion and a second supply portion configured to supply powder, a first layer forming portion and a second layer forming portion configured to form a powder layer on the shaping table using the powder, and at least one head configured to discharge a liquid containing a binder to a shaping region of the three-dimensional shaped object on the powder layer; a layer forming and moving portion configured to move the first layer forming portion and the second layer forming portion in an approaching or separating direction that is a direction approaching or separating from the shaping table; and a control unit configured to control the layer forming and moving portion, the unit, and the shaping table, in which the unit includes the first supply portion, the first layer forming portion, the head, the second layer forming portion, and the second supply portion in an order from a head side in a forward direction in a reciprocating direction of the unit, and the control unit performs control to, when moving the unit in the forward direction when shaping the three-dimensional shaped object, supply the powder from the first supply portion, form the powder layer on the shaping table using the powder by the first layer forming portion, discharge the liquid to the shaping region from the head, and move the second layer forming portion in a direction separating from the shaping table before the second layer forming portion faces the shaping region, and when moving the unit in a backward direction in the reciprocating direction when shaping the three-dimensional shaped object, supply the powder from the second supply portion, form the powder layer on the shaping table using the powder by the second layer forming portion, discharge the liquid to the shaping region from the head, and move the first layer forming portion in the direction separating from the shaping table before the first layer forming portion faces the shaping region.

DESCRIPTION OF EXEMPLARY EMBODIMENTS

Figure 1:
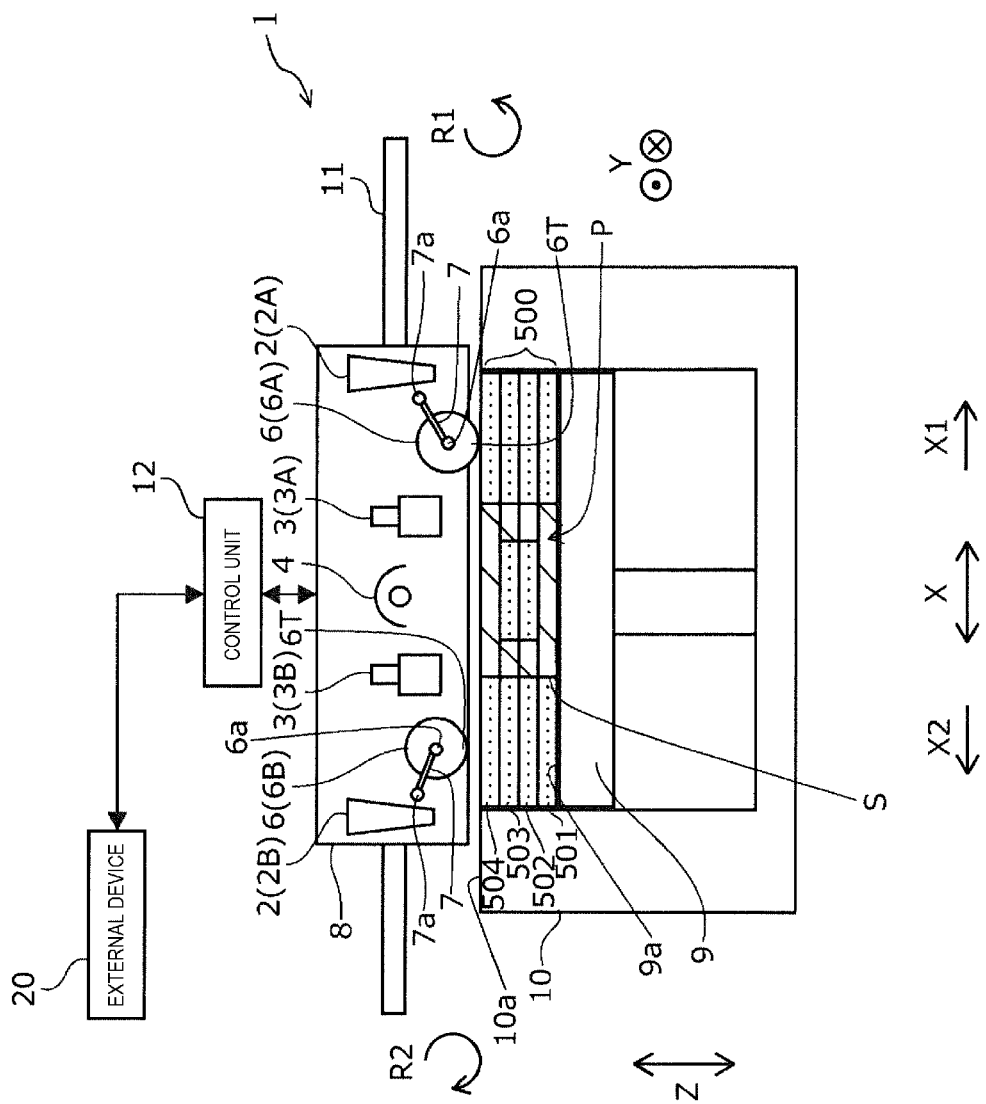
FIG. 1 is a schematic configuration diagram showing a three-dimensional shaped object manufacturing device according to a first embodiment of the present disclosure.

First, the present disclosure will be schematically described.

A three-dimensional shaped object manufacturing device according to a first aspect of the present disclosure includes: a shaping table; a unit configured to reciprocate with respect to the shaping table and including a first supply portion and a second supply portion configured to supply powder, a first layer forming portion and a second layer forming portion configured to form a powder layer on the shaping table using the powder, and at least one head configured to discharge a liquid containing a binder to a shaping region of the three-dimensional shaped object on the powder layer; a layer forming and moving portion configured to move the first layer forming portion and the second layer forming portion in an approaching or separating direction that is a direction approaching or separating from the shaping table; and a control unit configured to control the layer forming and moving portion, the unit, and the shaping table, in which the unit includes the first supply portion, the first layer forming portion, the head, the second layer forming portion, and the second supply portion in an order from a head side in a forward direction in a reciprocating direction of the unit, and the control unit performs control to, when moving the unit in the forward direction when shaping the three-dimensional shaped object, supply the powder from the first supply portion, form the powder layer on the shaping table using the powder by the first layer forming portion, discharge the liquid to the shaping region from the head, and move the second layer forming portion in a direction separating from the shaping table before the second layer forming portion faces the shaping region, and when moving the unit in a backward direction in the reciprocating direction when shaping the three-dimensional shaped object, supply the powder from the second supply portion, form the powder layer on the shaping table using the powder by the second layer forming portion, discharge the liquid to the shaping region from the head, and move the first layer forming portion in the direction separating from the shaping table before the first layer forming portion faces the shaping region.

According to this aspect, since the first supply portion and the second supply portion, the first layer forming portion and the second layer forming portion, and the head are included in one unit, enlargement in a size of the device can be prevented. In addition, since the supply portions configured to supply the powder, the forming portions configured to form the powder layer, and heads are symmetrical in the reciprocating direction of the unit, a structure of the three-dimensional shaped object can be manufactured in the forward and backward directions, so that the three-dimensional shaped object can be manufactured at a high speed. Further, since the downstream layer forming portion moves in the direction separating from the shaping table before the downstream layer forming portion faces the shaping region in the reciprocating direction with respect to the head in the forward and backward directions of the unit, contact between the downstream layer forming portion and the structure of the three-dimensional shaped object during the manufacturing can be prevented.

In the three-dimensional shaped object manufacturing device according to a second aspect of the present disclosure according to the first aspect, the binder is a resin cured by applying energy, and the unit includes at least one energy applying portion for curing the binder.

According to this aspect, it is possible to firmly bind the powder by using the resin cured by applying the energy.

In the three-dimensional shaped object manufacturing device according to a third aspect of the present disclosure according to the second aspect, the head includes a first head and a second head, the first head is disposed between the first layer forming portion and the second layer forming portion in the reciprocating direction, a distance between the first head and the first layer forming portion in the reciprocating direction is shorter than a distance between the first head and the second layer forming portion, the second head is disposed between the first layer forming portion and the second layer forming portion in the reciprocating direction, a distance between the second head and the second layer forming portion in the reciprocating direction is shorter than a distance between the second head and the first layer forming portion, and the energy applying portion is provided between the first head and the second head in the reciprocating direction.

According to this aspect, since the energy applying portion is provided in a symmetrical arrangement in the reciprocating direction of the unit, the energy can be applied in the forward and backward directions. Therefore, the three-dimensional shaped object can be manufactured at a high speed.

In the three-dimensional shaped object manufacturing device according to a fourth aspect of the present disclosure according to the second aspect, the energy applying portion includes a first energy applying portion and a second energy applying portion.

According to this aspect, since the energy applying portion includes the first energy applying portion and the second energy applying portion, for example, different types of energy can be applied. Therefore, it is possible to particularly effectively apply the energy to the structure of the three-dimensional shaped object when a plurality of binders having different curing properties are used.

In the three-dimensional shaped object manufacturing device according to a fifth aspect of the present disclosure according to the first aspect, the layer forming and moving portion moves only the first layer forming portion and the second layer forming portion of the unit with respect to the shaping table in the approaching or separating direction.

According to this aspect, since the layer forming and moving portion moves only the first layer forming portion and the second layer forming portion of the unit with respect to the shaping table in the approaching or separating direction, a movement load of the first layer forming portion and the second layer forming portion can be reduced.

In the three-dimensional shaped object manufacturing device according to a sixth aspect of the present disclosure according to the first aspect, the layer forming and moving portion moves the unit with respect to the shaping table in the approaching or separating direction.

According to this aspect, since the layer forming and moving portion moves the unit with respect to the shaping table in the approaching or separating direction, there is no need to individually move the first layer forming portion and the second layer forming portion, so that the control can be simplified.

In the three-dimensional shaped object manufacturing device according to a seventh aspect of the present disclosure according to the first aspect, the first layer forming portion and the second layer forming portion are rollers having rotation shafts in a direction intersecting the approaching or separating direction and the reciprocating direction, and the control unit, when moving the unit in the forward direction when shaping the three-dimensional shaped object, rotates the first layer forming portion such that a shaping table side of the first layer forming portion faces the head side in the forward direction, and when moving the unit in the backward direction when shaping the three-dimensional shaped object, rotates the second layer forming portion such that a shaping table side of the second layer forming portion faces a head side in the backward direction.

According to this aspect, the first layer forming portion and the second layer forming portion can be easily configured with the rollers, and by rotating a roller such that the shaping table side of the roller faces the head side in the moving direction of the unit, the powder layer can be formed with high accuracy.

In the three-dimensional shaped object manufacturing device according to an eighth aspect of the present disclosure according to the first aspect, an interval between the first layer forming portion and the head in the reciprocating direction and an interval between the second layer forming portion and the head in the reciprocating direction are adjustable.

According to this aspect, since the interval between the first layer forming portion and the head in the reciprocating direction and the interval between the second layer forming portion and the head in the reciprocating direction are adjustable, the interval between the first layer forming portion and the head in the reciprocating direction and the interval between the second layer forming portion and the head in the reciprocating direction can be optimized according to a size of the structure of the three-dimensional shaped object to be formed.

Embodiments of the present disclosure will be described below with reference to the accompanying drawings.

First, a three-dimensional shaped object manufacturing device 1 configured to execute a method for manufacturing a three-dimensional shaped object of the present disclosure according to an embodiment will be described with reference to FIG. 1. Here, in FIG. 1 and the figures to be described later, an X direction is a horizontal direction and corresponds to a reciprocating direction of a supply unit 8, and an X1 direction corresponds to a forward direction and an X2 direction corresponds to a backward direction. A Y direction is a horizontal direction and a direction orthogonal to the X direction, and corresponds to a direction in which a rotation shaft 6a of a roller 6 extends. A Z direction is a vertical direction, and corresponds to a stacking direction of layers 500 and an approaching or separating direction of the supply unit 8 with respect to a shaping table 9.

The term "three-dimensional shaping" in this description refers to forming a so-called three-dimensional shaped object, and includes, for example, forming a shape having a thickness even in a shape of a flat plate shape that is a so-called two-dimensional shape.

The three-dimensional shaped object manufacturing device 1 according to the present embodiment is a three-dimensional shaped object manufacturing device that manufactures a three-dimensional shaped object by stacking layers 500 including a layer 501, a layer 502, a layer 503, . . . , and a layer 50n. As shown in FIG. 1, the three-dimensional shaped object manufacturing device 1 according to the present embodiment includes a table unit 10 that includes a shaping table 9, the supply unit 8 that supplies a shaping material of the three-dimensional shaped object to the shaping table 9, and a control unit 12 that controls operations of the table unit 10 and the supply unit 8. The three-dimensional shaped object manufacturing device 1 is electrically coupled to an external device 20 such as a personal computer, and is configured to receive an instruction from a user via the external device 20.

The shaping table 9 is configured to move in the Z direction under a control of the control unit 12. A shaping surface 9a of the shaping table 9 is disposed at a position lower than an upper surface portion 10a of the table unit 10 by a predetermined distance in the Z direction, and the shaping material of the three-dimensional shaped object is supplied from the supply unit 8 to the shaping surface 9a to form one layer of the layers 500. Then, stacking is performed by repeating a downward movement of the shaping table 9 by a predetermined distance and a supply of the shaping material of the three-dimensional shaped object from the supply unit 8. FIG. 1 shows a state where a structure S of the three-dimensional shaped object is formed on the shaping surface 9a by repeating a formation of four layers of the layer 501, the layer 502, the layer 503, and a layer 504.

The supply unit 8 is configured to move in the X direction along a guide bar 11. In addition, the supply unit 8 includes shaping material supply portions 2 configured to supply the shaping material including powder of metal, ceramics, resin, or the like to the shaping table 9. The shaping material supply portions 2 include a first supply portion 2A formed at a head side end portion in the X1 direction and a second supply portion 2B formed at a head side end portion in the X2 direction.

In addition, the supply unit 8 includes the rollers 6 configured to compress and level the shaping material supplied to the shaping table 9. The rollers 6 include a roller 6A formed next to the first supply portion 2A in the X direction and a roller 6B formed next to the second supply portion 2B in the X direction. Here, the roller 6 constitutes a layer forming portion that forms the layer 500 that is a powder layer on the shaping table 9.

In both the roller 6A and the roller 6B, the rotation shaft 6a of the roller 6 is attached with a rod-shaped swing portion 7 that swings with respect to a swing shaft 7a. The supply unit 8 is configured to move the roller 6 in the approaching or separating direction that is a direction in which the roller 6 approaches or separates from the shaping table 9 by moving the swing portion 7 with respect to the swing shaft 7a. FIG. 1 shows a state where the roller 6A is disposed at a position where the roller 6A is disposed at a position in contact with the layer 500, and the roller 6B is disposed at a position not in contact with the layer 500 by moving the swing portion 7.

In addition, the supply unit 8 includes heads 3 that discharge a liquid containing a binder for binding powder contained in the shaping material supplied from the shaping material supply portions 2 to a shaping region P of the three-dimensional shaped object. The heads 3 include a first head 3A formed next to the roller 6A in the X direction and a second head 3B formed next to the roller 6B in the X direction. Here, the liquids discharged from the first head 3A and the second head 3B are the same liquid, and are liquids containing an ultraviolet ray curable resin as the binder. However, the liquid is not limited to such a liquid, and a liquid containing a thermosetting resin as the binder, a liquid in a state where a solid resin as the binder is dissolved in a volatile solvent, or the like may be used. Compositions of the liquid discharged from the first head 3A and the second head 3B may be different.

An ultraviolet ray irradiation portion 4 that performs irradiation with ultraviolet rays for curing the ultraviolet ray curable resin is provided between the first head 3A and the second head 3B in the X direction. The supply unit 8 according to the present embodiment includes one ultraviolet ray irradiation portion 4, but may include two or more ultraviolet ray irradiation portions 4, or according to a type of the liquid used, not include the ultraviolet ray irradiation portion 4, or include a heater for curing the thermosetting resin or volatilizing the solvent instead of the ultraviolet ray irradiation portion 4, or the like.

As shown in FIG. 1, in the supply unit 8 according to the present embodiment, structural members are disposed symmetrically in the X direction with respect to the ultraviolet ray irradiation portion 4. Therefore, the three-dimensional shaped object manufacturing device 1 according to the present embodiment can execute a shaping operation of the three-dimensional shaped object while moving the supply unit 8 in the X1 direction, and execute a shaping operation of the three-dimensional shaped object while moving the supply unit 8 in the X2 direction.

Thus, the three-dimensional shaped object manufacturing device 1 according to the present embodiment includes the shaping table 9. In addition, the three-dimensional shaped object manufacturing device 1 includes the supply unit 8 configured to reciprocate with respect to the shaping table 9 and including the first supply portion 2A and the second supply portion 2B configured to supply the powder, the roller 6A as a first layer forming portion and the roller 6B as a second layer forming portion configured to form the layer 500 that is a powder layer on the shaping table 9 using powder, and at least one head 3 configured to discharge a liquid containing a binder to the shaping region P of the three-dimensional shaped object in the layer 500. The roller 6A and the roller 6B are provided with the swing portion 7 as a layer forming and moving portion configured to move in the approaching or separating direction with respect to the shaping table 9. Further, the three-dimensional shaped object manufacturing device 1 includes the control unit 12 configured to control the structural member of the supply unit 8 including the swing portion 7 and the shaping table 9. Then, the supply unit 8 includes the first supply portion 2A, the roller 6A, the head 3, the roller 6B, and the second supply portion 2B in an order from a head side in the X1 direction of the supply unit 8.

Next, a specific example of the shaping material that can be used in the three-dimensional shaped object manufacturing device 1 according to the present embodiment will be described. As metal powder that can be contained in the shaping material, for example, simple powder of magnesium (Mg), iron (Fe), cobalt (Co), chromium (Cr), aluminum (Al), titanium (Ti), copper (Cu), and nickel (Ni), or powder of alloys containing one or more of these metals (maraging steel, stainless steel (SUS), cobalt chromium molybdenum, titanium alloy, nickel alloy, aluminum alloy, cobalt alloy, and cobalt chromium alloy), and mixed powder thereof can be used.

In addition, as ceramic powder that can be contained in the shaping material, for example, silicon dioxide, titanium dioxide, aluminum oxide, zirconium oxide, and silicon nitride can be used.

As resin powder that can be used in the shaping material, or as a binder contained in the liquid, for example, acryl (PMMA), acrylonitrile-butadiene-acrylate (ABS), acrylonitrile-styrene-acrylate (ASA), polylactic acid (PLA), polyetherimide (PEI), polycarbonate (PC), polypropylene (PP), polyethylene (PE), polyamide (PA), epoxy (EP), polyphenylene sulfide (PPS), polystyrene (PS), paraffin wax, polyvinyl alcohol (PVA), carboxymethyl cellulose, polyoxymethylene, and polymethyl methacrylate can be preferably used. In addition, for example, an acrylic resin, an epoxy resin, a silicone resin, a cellulosic resin, or another synthetic resin can be used alone or in combination. Further, a thermoplastic resin, an ultraviolet ray curable resin of a type using radical polymerization of an unsaturated double bond such as acrylic or a type using cationic polymerization such as epoxy can also be used.

As a solvent contained in the liquid, for example, water, (poly) alkylene glycol monoalkyl ethers such as ethylene glycol monomethyl ether, ethylene glycol monoethyl ether, propylene glycol monomethyl ether, and propylene glycol monoethyl ether, acetates such as ethyl acetate, n-propyl acetate, isopropyl acetate, n-butyl acetate, and isobutyl acetate, aromatic hydrocarbons such as benzene, toluene, and xylene, ketones such as methyl ethyl ketone, acetone, methyl isobutyl ketone, ethyl-n-butyl ketone, diisopropyl ketone, and acetylacetone, alcohols such as ethanol, propanol, and butanol, tetraalkylammonium acetates, sulfoxide-based solvents such as dimethyl sulfoxide and diethyl sulfoxide, pyridine-based solvents such as pyridine, γ-picoline, and 2,6-lutidine, and ionic liquids such as tetraalkylammonium acetates (such as tetrabutylammonium acetate) can be used, and one or two or more selected from these can be used in combination.

Figure 2:
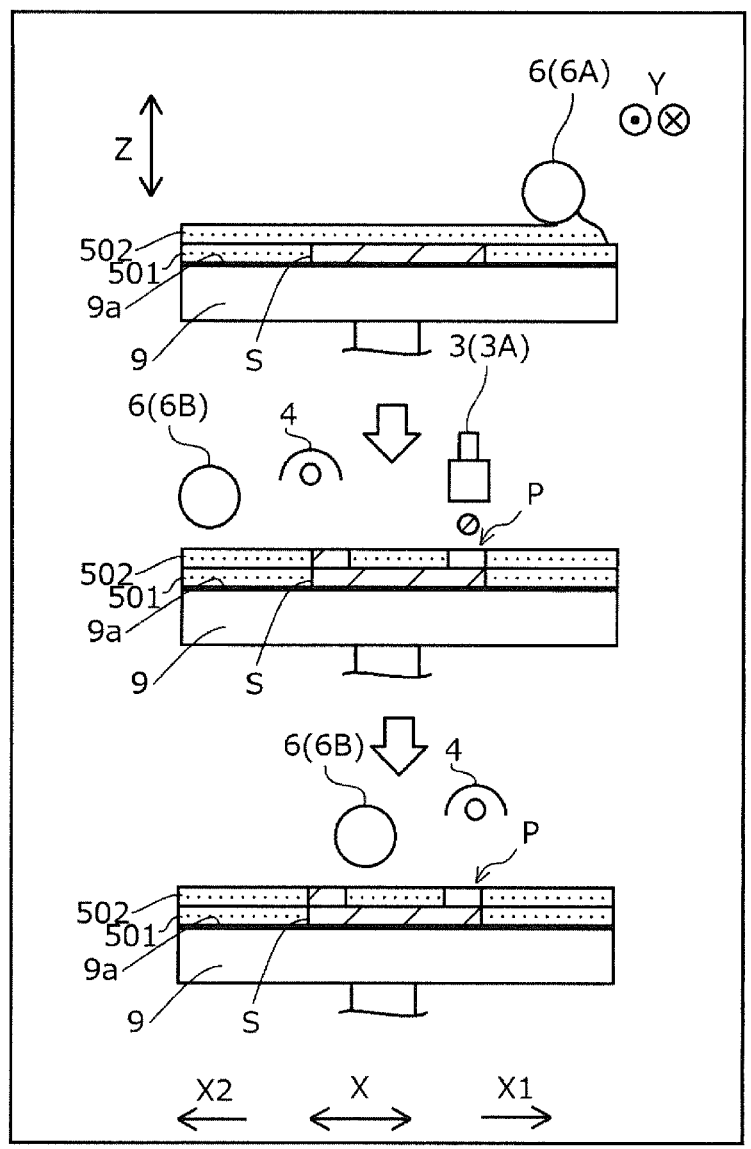
FIG. 2 is a schematic diagram showing a method for manufacturing a three-dimensional shaped object using the three-dimensional shaped object manufacturing device according to the first embodiment.
Figure 3:
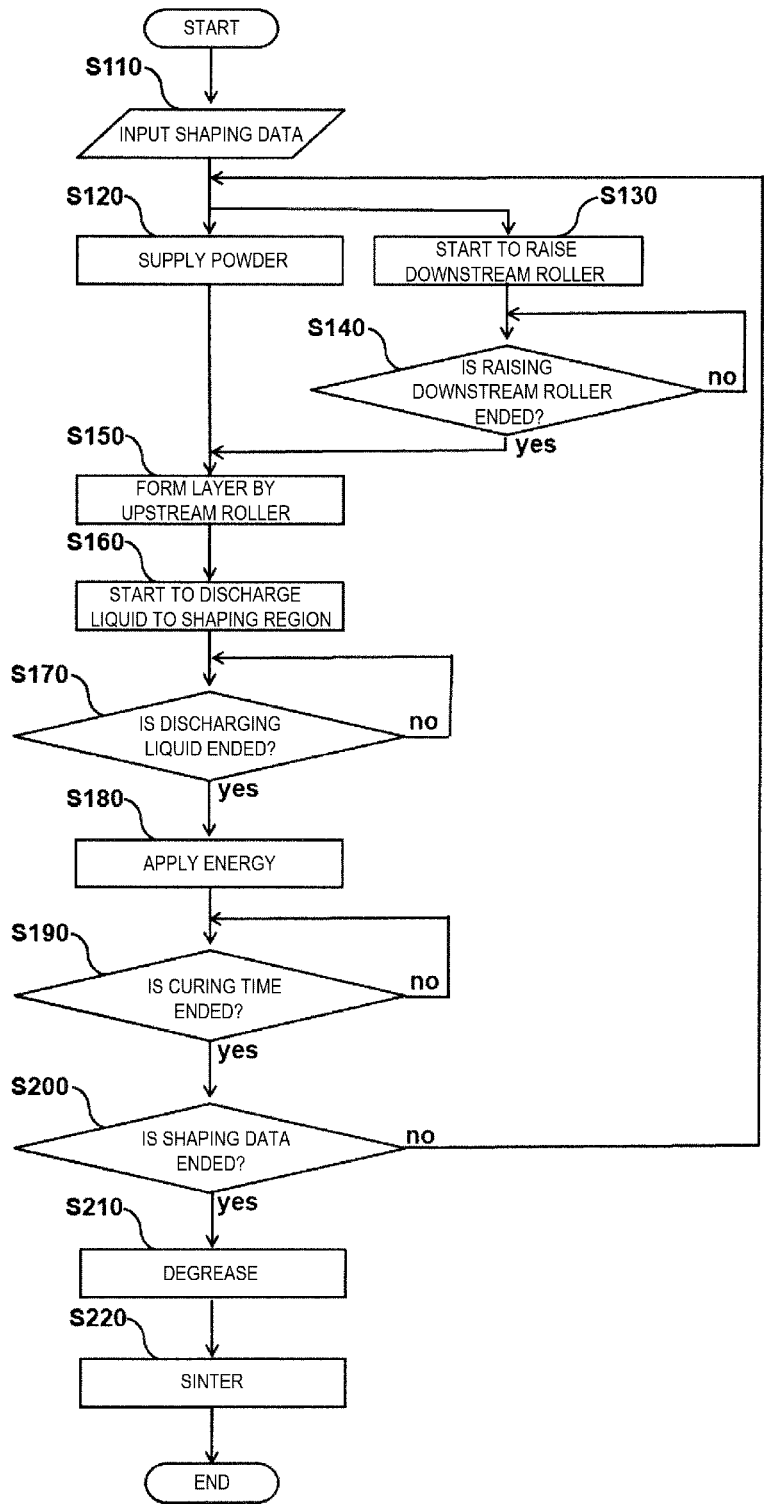
FIG. 3 is a flowchart of the method for manufacturing a three-dimensional shaped object using the three-dimensional shaped object manufacturing device according to the first embodiment.

Next, an example of a method for manufacturing a three-dimensional shaped object configured to be executed using the three-dimensional shaped object manufacturing device 1 will be described with reference to FIG. 2 and a flowchart of FIG. 3. The method for manufacturing a three-dimensional shaped object according to the present embodiment shown by the flowchart of FIG. 3 is performed by the control unit 12 performing control of the structural members of the three-dimensional shaped object manufacturing device 1 such as the supply unit 8 and the shaping table 9. FIG. 2 shows an example when forming the layer 502 of the layers 500.

In the method for manufacturing a three-dimensional shaped object according to the present embodiment, as shown in FIG. 3, first, in step S110, shaping data of the three-dimensional shaped object to be manufactured is input. An input source of the shaping data of the three-dimensional shaped object is not particularly limited, and the shaping data can be input to the three-dimensional shaped object manufacturing device 1 using the external device 20.

Next, in step S120, the shaping material supply portion 2 supplies the shaping material to the shaping surface 9a of the shaping table 9, thereby supplying powder as a constituent material of the three-dimensional shaped object, and in step S130, the control unit 12 controls the swing portion 7 to raise the downstream roller 6 in a moving direction of the supply unit 8. Raising the downstream roller 6 is, specifically, when the supply unit 8 moves in the X1 direction to form the layer 500, raising the downstream roller 6B in the moving direction of the supply unit 8, and when the supply unit 8 moves in the X2 direction to form the layer 500, raising the downstream roller 6A in the moving direction of the supply unit 8. In step S130, the downstream roller 6 is raised so as not to come into contact with the shaping material supplied from the shaping material supply portion 2 as described above, and the upstream roller 6 is disposed at a desired position such that the layer 500 can be formed of the shaping material supplied from the shaping material supply portion 2.

Next, in step S140, the control unit 12 determines whether raising the downstream roller 6 is ended, and when it is determined that raising the downstream roller 6 is ended, the processing proceeds to step S150. Then, in step S150, the shaping material is compressed and leveled by the upstream roller 6 to form the layer 500. An uppermost state diagram of FIG. 2 shows a state where the supply unit 8 moves in the X1 direction to form the layer 502. Here, when the supply unit 8 moves in the X1 direction to form the layer 500, the shaping material is supplied from the first supply portion 2A and is compressed and leveled by the roller 6A to form the layer 500. On the other hand, when the supply unit 8 moves in the X2 direction to form the layer 500, the shaping material is supplied from the second supply portion 2B and is compressed and leveled by the roller 6B to form the layer 500.

In the method for manufacturing a three-dimensional shaped object of the present embodiment, the formation of the layer 500 is started by the upstream roller 6 after raising the downstream roller 6 is ended, but the method is not limited to such a method. For example, step S140 may be omitted, and the downstream roller 6 may be raised while the layer 500 is formed by the upstream roller 6. Further, the downstream roller 6 may be raised after the formation of the layer 500 is started by the upstream roller 6. As shown in a middle state diagram of FIG. 2 and in a lowermost state diagram of FIG. 2, the downstream roller 6 may be raised before the upstream roller 6 reaches at least a position facing the shaping region P of the three-dimensional shaped object.

Next, in step S160, the head 3 discharges the liquid containing the binder to the shaping region P of the three-dimensional shaped object in the layer 500. A second state diagram from a top of FIG. 2 shows a state where the head 3 discharges the liquid to the shaping region P of the layer 502 while the supply unit 8 moves in the X1 direction. Here, when the supply unit 8 moves in the X1 direction to form the layer 500, the first head 3A discharges the liquid. On the other hand, when the supply unit 8 moves in the X2 direction to form the layer 500, the second head 3B discharges the liquid.

Then, in step S170, the control unit 12 determines whether discharging the liquid from the head 3 is ended, and when it is determined that discharging the liquid from the head 3 is ended, in step S180, the ultraviolet ray curable resin contained in the liquid is cured by the energy applied by the irradiation of ultraviolet rays from the ultraviolet ray irradiation portion 4. Thereafter, in step S190, the control unit 12 determines whether a curing time for curing the ultraviolet ray curable resin contained in the liquid is ended. The second state diagram from the top of FIG. 2 shows a state where the application of energy is started, and the lowermost state diagram of FIG. 2 shows a state where the application of energy is ended. For example, it can be determined whether the curing time is ended, for example, by measuring an elapsed time from the state shown in the lowermost state diagram of FIG. 2 by a timer (not shown).

Then, in step S200, the control unit 12 determines whether the formation of all the layers 500 is ended based on the shaping data input in step S110. When it is determined that the formation of all the layers 500 is not ended, the processing returns to step S120 to form the next layer 500. On the other hand, when it is determined that the formation of all the layers 500 is ended, the processing proceeds to step S230.

In step S210, a resin component of the structure S manufactured by repeating steps S120 to S200, such as a binder, is degreased using an external device or the like. A degreasing method includes, but is not limited to, a method of volatilizing the resin component by heating, and a method of immersing the structure S in a solvent to dissolve the resin component. This step S210 may be omitted depending on a type of the three-dimensional shaped object to be manufactured, such as a case of manufacturing a three-dimensional shaped object made of the resin.

In step S220, the structure S degreased in step S210 using the external device or the like is heated to sinter the shaping material. Even when the resin component such as a binder remains in the structure S after the execution of step S210, the resin component is removed along with the execution of step S220. Then, with an end of the step S220, the method for manufacturing a three-dimensional shaped object according to the present embodiment is ended. This step S220 may be omitted depending on the type of the three-dimensional shaped object to be manufactured, similar as in step S210.

That is, in the three-dimensional shaped object manufacturing device 1 according to the present embodiment, the control unit 12 performs controls to, when moving the supply unit 8 in the X1 direction when shaping the three-dimensional shaped object, supply the powder from the first supply portion 2A, form the layer 500 containing the powder supplied to the shaping table 9 by the roller 6A, discharge the liquid to the shaping region P from the head 3, and move the roller 6B in a direction separating from the shaping table 9 before the roller 6B faces the shaping region P, and when moving the supply unit 8 in the X2 direction when shaping the three-dimensional shaped object, supply the powder from the second supply portion 2B, form the layer 500 containing the powder supplied to the shaping table 9 by the roller 6B, discharge the liquid to the shaping region P from the head 3, and move the roller 6A in the direction separating from the shaping table 9 before the roller 6A faces the shaping region P.

As described above, in the three-dimensional shaped object manufacturing device 1 according to the present embodiment, since the first supply portion 2A and the second supply portion 2B, the roller 6A and the roller 6B, and the head 3 are included in one supply unit 8, enlargement in a size of the device is prevented. In addition, since the shaping material supply portions 2 configured to supply the powder, the rollers 6 as forming portions configured to form the layer 500, and the heads 3 are symmetrical in the reciprocating direction of the supply unit 8, the structure S of the three-dimensional shaped object can be manufactured in the forward and backward directions, so that the three-dimensional shaped object can be manufactured at a high speed. Further, since the downstream roller 6 moves in the direction separating from the shaping table 9 before the downstream roller 6 faces the shaping region P in the reciprocating direction in the movement in the forward and backward directions of the supply unit 8, the contact between the roller 6 and the structure S of the three-dimensional shaped object during the manufacturing can be prevented.

As described above, in the three-dimensional shaped object manufacturing device 1 according to the present embodiment, the binder in the liquid is a resin cured by applying energy, and the binder is cured by the ultraviolet ray irradiation portion 4 as an energy applying portion included in the supply unit 8. Therefore, it is possible to firmly bind the powder by using the resin cured by applying the energy.

Here, the three-dimensional shaped object manufacturing device 1 according to the present embodiment includes, as the head 3, the first head 3A provided between the roller 6A and the ultraviolet ray irradiation portion 4 in the X direction, and the second head 3B provided between the roller 6B and the ultraviolet ray irradiation portion 4 in the X direction. Thus, by providing the ultraviolet ray irradiation portion 4 in a symmetrical arrangement in the reciprocating direction of the supply unit 8, the energy can be applied in the forward and backward directions, and the three-dimensional shaped object can be manufactured at a high speed.

As described above, in the three-dimensional shaped object manufacturing device 1 according to the present embodiment, the swing portion 7 that is the layer forming and moving portion moves only the roller 6A as the first layer forming portion and the roller 6B as the second layer forming portion of the supply unit 8 with respect to the shaping table 9 in the approaching or separating direction. With such a configuration, a movement load of the first layer forming portion and the second layer forming portion can be reduced. However, the present disclosure is not limited to such a configuration, and the supply unit 8 may be moved with respect to the shaping table 9 in the approaching or separating direction.

In the three-dimensional shaped object manufacturing device 1 according to the present embodiment, the first layer forming portion and the second layer forming portion are the rollers 6 having rotation shafts 6a in the Y direction intersecting the Z direction that is the approaching or separating direction and the X direction that is the reciprocating direction. Then, the control unit 12 can perform control to, when moving the supply unit 8 in the X1 direction when shaping the three-dimensional shaped object, rotate the roller 6A as the first layer forming portion in a rotation direction R1 (see FIG. 1) such that a shaping table side 6T of the roller 6A faces the head side in the X1 direction, and when moving the supply unit 8 in the X2 direction when shaping the three-dimensional shaped object, rotate the roller 6B as the second layer forming portion in a rotation direction R2 (see FIG. 1) such that a shaping table side 6T of the roller 6B faces a head side in the X2 direction. In the three-dimensional shaped object manufacturing device 1 according to the present embodiment, the first layer forming portion and the second layer forming portion can be easily configured with the rollers 6, and by rotating the roller 6 such that the shaping table side 6T of the roller 6 faces the head side in the moving direction of the supply unit 8, the layer 500 can be formed with high accuracy as a powder layer.

Second Embodiment

Figure 4:
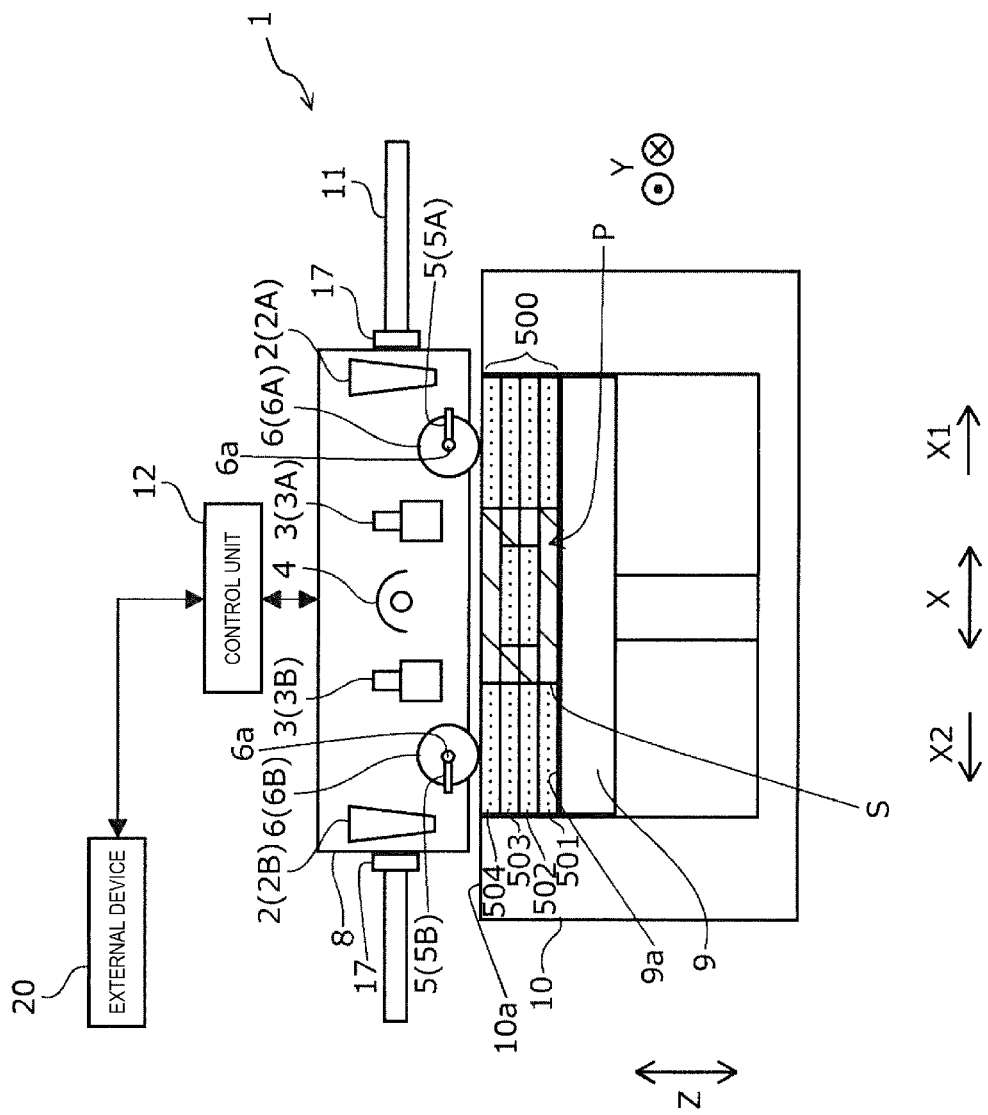
FIG. 4 is a schematic configuration diagram showing a three-dimensional shaped object manufacturing device according to a second embodiment of the present disclosure.

Next, an example of the three-dimensional shaped object manufacturing device 1 according to a second embodiment having a configuration different from the three-dimensional shaped object manufacturing device 1 according to the first embodiment will be described with reference to FIG. 4. FIG. 4 is a diagram corresponding to FIG. 1 for the three-dimensional shaped object manufacturing device 1 according to the first embodiment. Here, the three-dimensional shaped object manufacturing device 1 according to the present embodiment has a configuration similar to that of the three-dimensional shaped object manufacturing device 1 according to the first embodiment except for the supply unit 8. Therefore, a description of the configuration other than the supply unit 8 that is a part having a common configuration is omitted. Structural members common to the first embodiment are denoted by the same reference numerals.

As described above, the three-dimensional shaped object manufacturing device 1 according to the first embodiment includes the swing portion 7 as the layer forming and moving portion that moves only the roller 6A as the first layer forming portion and the roller 6B as the second layer forming portion of the supply unit 8 with respect to the shaping table 9 in the approaching or separating direction. On the other hand, the three-dimensional shaped object manufacturing device 1 according to the first embodiment includes a rack and pinion portion 17 as a layer forming and moving portion that moves the entire supply unit 8 with respect to the shaping table 9 in the approaching or separating direction. The three-dimensional shaped object manufacturing device 1 according to the present embodiment is configured such that, under the control of the control unit 12, the entire supply unit 8 is configured to move, by the rack and pinion portion 17, with respect to the shaping table 9 in the Z direction. With such a configuration, since there is no need to individually move the first layer forming portion and the second layer forming portion in the three-dimensional shaped object manufacturing device 1 according to the present embodiment, the control can be simplified. In the three-dimensional shaped object manufacturing device 1 according to the present embodiment, a timing at which the supply unit 8 is raised is a timing after the upstream head 3 in the moving direction of the supply unit 8 ends discharging the liquid to the shaping region P and before the downstream roller 6 in the moving direction of the supply unit 8 faces the shaping region P.

In addition, as shown in FIG. 4, the supply unit 8 includes interval adjustment portions 5 configured to change positions of the rollers 6 in the X direction. Of the interval adjustment portion 5A, an interval adjustment portion 5A adjusts an interval between the roller 6A and the head 3 in the X direction, and an interval adjustment portion 5B adjusts an interval between the roller 6B and the head 3 in the X direction. In other words, a distance from the upstream head 3 to the downstream roller 6 in a moving direction of the supply unit 8 is adjustable. Therefore, the three-dimensional shaped object manufacturing device 1 according to the present embodiment can optimize the interval between the roller 6A and the head 3 in the X direction and the interval between the roller 6B and the head 3 in the X direction according to a size of the structure S of the three-dimensional shaped object to be formed.

Third Embodiment

Figure 5:
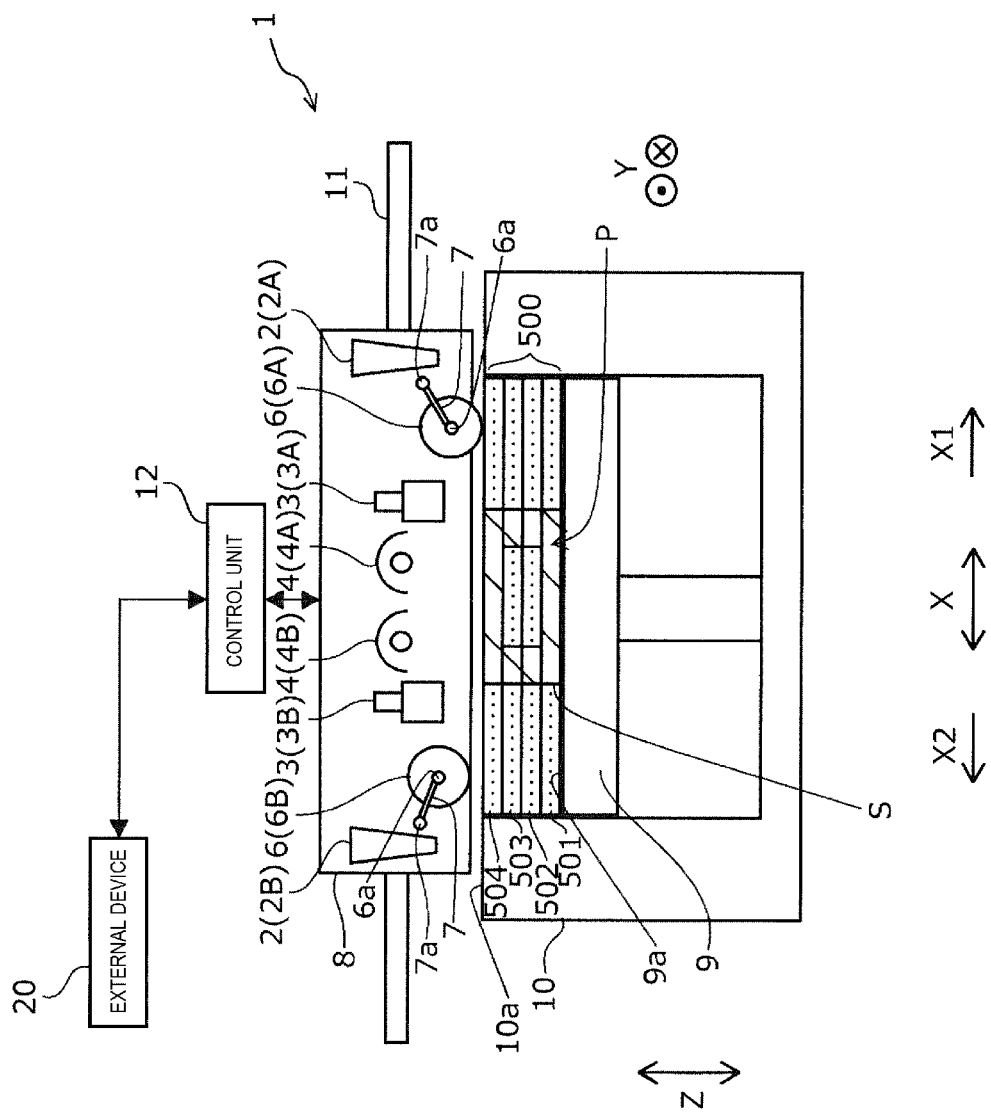
FIG. 5 is a schematic configuration diagram showing a three-dimensional shaped object manufacturing device according to a third embodiment of the present disclosure.

Next, an example of the three-dimensional shaped object manufacturing device 1 according to a third embodiment having a configuration different from the three-dimensional shaped object manufacturing devices 1 according to the first and second embodiments will be described with reference to FIG. 5. FIG. 5 is a diagram corresponding to FIG. 1 for the three-dimensional shaped object manufacturing device 1 according to the first embodiment and FIG. 4 for the three-dimensional shaped object manufacturing device 1 according to the second embodiment. Here, the three-dimensional shaped object manufacturing device 1 according to the present embodiment has a configuration similar to that of the three-dimensional shaped object manufacturing devices 1 according to the first and second embodiments except for the supply unit 8. Specifically, the three-dimensional shaped object manufacturing device 1 according to the present embodiment is different from the three-dimensional shaped object manufacturing device 1 according to the first embodiment only in that a plurality of ultraviolet ray irradiation portions 4 are included. Therefore, a description of the configuration other than the supply unit 8 that is a part having a common configuration is omitted. Structural members common to the first and second embodiments are denoted by the same reference numerals.

As shown in FIG. 5, the three-dimensional shaped object manufacturing device 1 according to the present embodiment includes a first energy applying portion 4A and a second energy applying portion 4B as the ultraviolet ray irradiation portion 4 serving as the energy applying portion. Therefore, since the three-dimensional shaped object manufacturing device 1 according to the present embodiment can use, for example, different types of energy, it is possible to particularly effectively apply the energy to the structure S of the three-dimensional shaped object when a plurality of binders having different curing properties are used.

Fourth Embodiment

Figure 6:
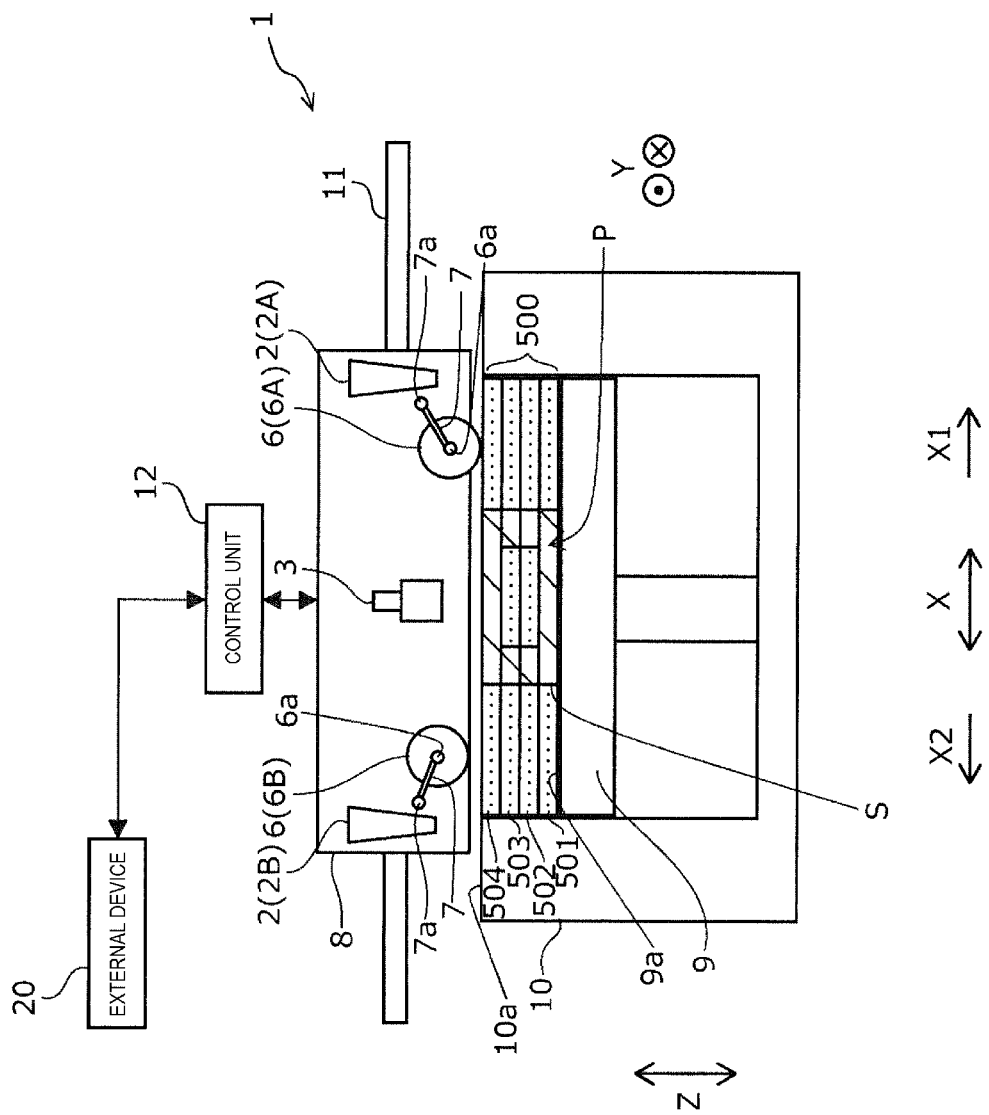
FIG. 6 is a schematic configuration diagram showing a three-dimensional shaped object manufacturing device according to a fourth embodiment of the present disclosure.

Next, an example of the three-dimensional shaped object manufacturing device 1 according to a fourth embodiment having a configuration different from the three-dimensional shaped object manufacturing devices 1 according to the first to the third embodiments will be described with reference to FIG. 6. FIG. 6 is a diagram corresponding to FIG. 1 for the three-dimensional shaped object manufacturing device 1 according to the first embodiment, FIG. 4 for the three-dimensional shaped object manufacturing device 1 according to the second embodiment, and FIG. 5 for the three-dimensional shaped object manufacturing device 1 according to the third embodiment. Here, the three-dimensional shaped object manufacturing device 1 according to the present embodiment has a configuration similar to that of the three-dimensional shaped object manufacturing devices 1 according to the first to the third embodiments except for the supply unit 8. Therefore, a description of the configuration other than the supply unit 8 that is a part having a common configuration is omitted. Structural members common to the first to the third embodiments are denoted by the same reference numerals.

As shown in FIG. 6, the three-dimensional shaped object manufacturing device 1 according to the present embodiment includes only one head 3 and does not include the energy applying portion. The binder contained in the liquid discharged from the head 3 of the present embodiment is a liquid in which a solid resin is dissolved in a volatile solvent. When using such a liquid, since the solvent in the liquid can be naturally dried, the structure S of the three-dimensional shaped object can be formed without the energy applying portion. In a configuration having no energy applying portion, even in a configuration including only one head 3, the structural members are disposed symmetrically in the X direction. Therefore, the three-dimensional shaped object manufacturing device 1 according to the present embodiment can also execute a shaping operation of the three-dimensional shaped object while moving the supply unit 8 in the X1 direction, and execute a shaping operation of the three-dimensional shaped object while moving the supply unit 8 in the X2 direction.

The present disclosure is not limited to the embodiments described above, and may be implemented by various configurations without departing from the scope thereof. For example, in order to solve some or all of problems described above, or to achieve some or all of effects described above, technical characteristics in the embodiments corresponding to the technical characteristics in each embodiment described in the summary of the disclosure can be replaced or combined as appropriate. If the technical characteristics are not described as essential in the present description, they can be deleted as appropriate.

What is claimed is:

1. A three-dimensional shaped object manufacturing device, comprising:
   a shaping table;
   a supply unit configured to reciprocate with respect to the shaping table and including a first supply portion and a second supply portion configured to supply powder, a first roller and a second roller configured to form a powder layer on the shaping table using the powder, and at least one head configured to discharge a liquid containing a binder to a shaping region of the three-dimensional shaped object on the powder layer;
   a layer forming and moving portion configured to move the first roller and the second roller in an approaching or separating direction that is a direction approaching or separating from the shaping table, wherein the layer forming and moving portion comprises a first rotation shaft attached to the first roller, the first rotation shaft attached with a first rod-shaped swing portion configured to swing with respect to a first swing shaft, and
   a control unit configured to control the layer forming and moving portion, the unit, and the shaping table, wherein
   the unit includes the first supply portion, the first layer forming portion, the head, the second layer forming portion, and the second supply portion in an order from a head side in a forward direction in a reciprocating direction of the unit, and
   the control unit is configured to perform control to,
   when moving the unit in the forward direction when shaping the three-dimensional shaped object, supply the powder from the first supply portion, form the powder layer on the shaping table using the powder by the first layer forming portion, discharge the liquid to the shaping region from the head, and move the second layer forming portion in a direction separating from the shaping table before the second layer forming portion faces the shaping region, and
   when moving the unit in a backward direction in the reciprocating direction when shaping the three-dimensional shaped object, supply the powder from the second supply portion, form the powder layer on the shaping table using the powder by the second layer forming portion, discharge the liquid to the shaping region from the head, and move the first layer forming portion in the direction separating from the shaping table before the first layer forming portion faces the shaping region.

2. The three-dimensional shaped object manufacturing device according to claim 1, wherein
   the binder is a resin cured by applying energy, and
   the unit includes at least one energy applying portion for curing the binder.

3. The three-dimensional shaped object manufacturing device according to claim 2, wherein
   the head includes a first head and a second head,
   the first head is disposed between the first roller and the second roller in the reciprocating direction,
   a distance between the first head and the first roller in the reciprocating direction is shorter than a distance between the first head and the second roller,
   the second head is disposed between the first roller and the second roller in the reciprocating direction,
   a distance between the second head and the second roller in the reciprocating direction is shorter than a distance between the second head and the first roller, and
   the energy applying portion is provided between the first head and the second head in the reciprocating direction.

4. The three-dimensional shaped object manufacturing device according to claim 2, wherein
   the energy applying portion includes a first energy applying portion and a second energy applying portion.

5. The three-dimensional shaped object manufacturing device according to claim 1, wherein
   the first rollers having rotation shafts in a direction intersecting the approaching or separating direction and the reciprocating direction, and
   the control unit configured to,
   when moving the unit in the forward direction when shaping the three-dimensional shaped object, rotates the first roller such that a shaping table side of the first layer forming portion faces the head side in the forward direction, and
   when moving the unit in the backward direction when shaping the three-dimensional shaped object, rotates the second roller such that a shaping table side of the second layer forming portion faces a head side in the backward direction.

6. The three-dimensional shaped object manufacturing device according to claim 1, wherein an interval between the first roller and the head in the reciprocating direction and an interval between the second roller and the head in the reciprocating direction are adjustable.

* * * * *